SIMPLEX TELEGRAPH SYSTEM WITH BREAK-IN FACILITY

Filed June 13, 1966 5 Sheets-Sheet 1

INVENTOR.
HERMAN DA SILVA
BY
ATTORNEY

May 23, 1967 H. DA SILVA 3,321,573

SIMPLEX TELEGRAPH SYSTEM WITH BREAK-IN FACILITY

Filed June 13, 1966 5 Sheets-Sheet 2

HERMAN DA SILVA
INVENTOR.
BY Hugh A. Kirk
ATTORNEY

May 23, 1967 H. DA SILVA 3,321,573

SIMPLEX TELEGRAPH SYSTEM WITH BREAK-IN FACILITY

Filed June 13, 1966 5 Sheets-Sheet 3

INVENTOR.
HERMAN DA SILVA
BY
ATTORNEY

SIMPLEX TELEGRAPH SYSTEM WITH BREAK-IN FACILITY

Filed June 13, 1966 5 Sheets-Sheet 4

INVENTOR.
HERMAN DA SILVA

BY Hugh A. Kirk

ATTORNEY

May 23, 1967 H. DA SILVA 3,321,573

SIMPLEX TELEGRAPH SYSTEM WITH BREAK-IN FACILITY

Filed June 13, 1966

5 Sheets-Sheet 5

INVENTOR.
HERMAN DA SILVA

BY

Hugh A. Kirk

ATTORNEY

United States Patent Office 3,321,573
Patented May 23, 1967

3,321,573

SIMPLEX TELEGRAPH SYSTEM WITH BREAK-IN FACILITY

Herman da Silva, Voorburg, Netherlands, assignor to De Stadt Nederlanden, ten Deze Vertegenwoordigd, Door de Directeur-Generaal der Posterijen, Telegrafie en Telefonie, The Hague, Netherlands Filed June 13, 1966, Ser. No. 557,105
12 Claims. (Cl. 178—2)

ABSTRACT OF THE DISCLOSURE

This invention provides a break-in facility in such systems, which facility comprises in addition to the two different types of answer-back signals between each message or traffic signal, a third type of answer-back signal, so that the transmission of traffic may be reversed.

This application is a continuation-in-part application of copending U.S. patent application Ser. No. 235,972, filed Nov. 7, 1962, now abandoned, whose priority is based on the Netherlands patent application Ser. No. 271,227, filed Nov. 10, 1961.

The invention relates to a one way-traffic or simplex telegraph system, particularly a type printing telegraph system with automatic repetition of mutilated signals wherein the request for repetition is indicated by a change in the alternation of two different types of answer-back signals transmitted between each received message or traffic signal. Such automatic error correcting systems are known from U.S. patent applications Ser. No. 94,337, filed Mar. 8, 1961 and Ser. No. 234,746, filed Nov. 1, 1962, now U.S. Patent No. 3,272,921, issued Sept. 13, 1966, both assigned to the same assignee as this application.

BACKGROUND OF INVENTION

In the prior art circuits in which the transmission of information is always in one direction, the information-sending subscriber who, when ending his message, expects an answer, must inform the information-receiving subscriber thereof. In existing telex traffic, this "expects-an-answer" communication or "over" is made by means of the combination of the characters: "figures" and "+." In telex circuits containing a radio link, it is usual that the reversal of the direction of traffic is announced by the combination of the characters: "figures," "+" and "?." The last-mentioned combinations are also used in the simplex radio circuit referred to above. Usually in telex circuits, however, if the information-receiving subscriber desires to start transmitting against the messages arriving at his station, the information received at both stations then becomes mutilated. This is considered by the transmitting subscriber as a request for stopping the transmission. The reason therefor can be, for example, that the information-receiving subscriber urgently desires to communicate something, or that his receiving equipment is out of order, so that a stop is necessary. Specifically, in radio telex circuits, the receiving subscriber may interfere, providing the radio link is a duplex or a two-way message and not a one-way message communication system. However, in telex radio circuits in which use is made of only one-way traffic, or simplex radio links, it is impossible for the information-receiving subscriber to interfere with messages being received in order to stop the flow of information, since the radio path is only a one-way path.

DESCRIPTION OF INVENTION

An object of this invention is to remove this difficulty. For this purpose the information-receiving station uses a third answer-back signal having such a mark-space ratio that it can only be simulated by a double transposition of the existing answer-back signals.

Generally speaking, according to one embodiment of this invention, when the information-sending subscriber wants to switch over, he transmits the combination of characters: "figures," "+," "?," to which the information-receiving station reacts by transmitting the herein described third answer-back signal. The information-sending station answers to or acknowledges this third answer-back signal by a special group of characters consisting of the combination of idle-time signals "$\beta$, $\alpha$, $\beta$," on reception of which the information-receiving station switches over to the information-sending state and requests, by means of a group of request for repetition signals I, for the first of the regular alternating two types of answer-back signals from the original information-sending station. Thus on reception of these signals I, that former sending station switches over to the information-receiving state.

Accordingly, due to the application of this method or system of switching over, it is the information-receiving station which asks for a switch-over by means of the third type of answer-back signal. However, this invitation can be made either by the information-sending station or by the information-receiving station.

In systems, according to another embodiment of this invention, in which the receiver of the information-sending station is not synchronized to the answer-back signals as in the above-mentioned patent application Ser. No. 234,746, and in which the two answer-back signals consist of the marking-frequency and the spacing-frequency, respectively, the third answer-back signal may be formed by transmitting these two frequencies alternately and for equal durations (i.e., transmitting reversals). For switching reasons, the duration of each of the alternate frequencies is chosen equal to, or a multiple of, the element length, but this is functionally not necessary.

The detection of these reversals at the information-sending station can be effected in different ways, such as for example, the so-called flywheel or resonant circuit which comprises a stepping-up circuit which is sharply tuned to the frequency by means of which the reversals are formed and which, after having been excited by the received reversals, delivers a voltage which is sufficiently high after some periods (or number of reversals) to change over a trigger circuit, from which the criterion of the third answer-back signal is obtained. Other methods consist in recording the received reversals in a shift-register for storing successive alternate impulses, and when a sufficient number of these reversals are detected, the desired third answer-back signal criterion has been received.

The above mentioned and other features and objects of this invention and the manner of attaining them will become more apparent and the invention itself will be understood best by reference to the following description of embodiments of the invention taken in conjection with the accompanying drawings, wherein.

Figure 1:
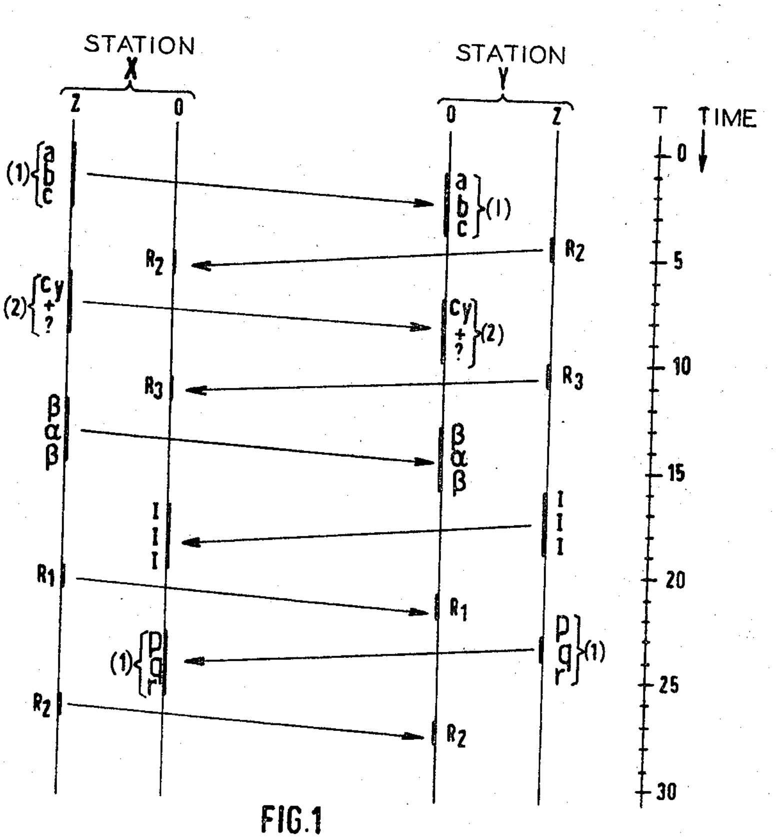
FIG. 1 is a schematic time diagram of signals communicated between two stations illustrating the course of the switch-over process according to one embodiment of this invention.
Figure 2:
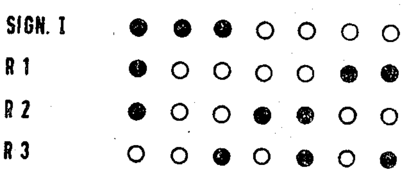
FIG. 2 is an example of a coding for the three answer-back signals and the special or request for repetition signal I used in the embodiment of FIG. 1.
Figure 3:
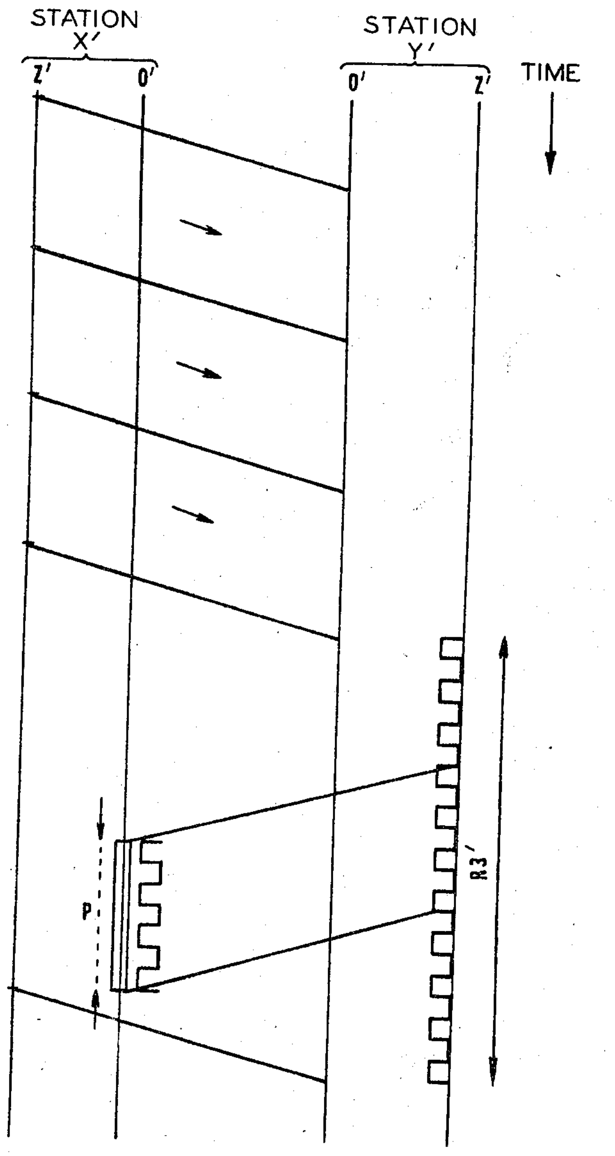
FIG. 3 is a schematic time diagram for signals communicated between two stations of how a third answer-back signal transmitted as reversals is transmitted and received according to another embodiment of this invention.
Figure 4:
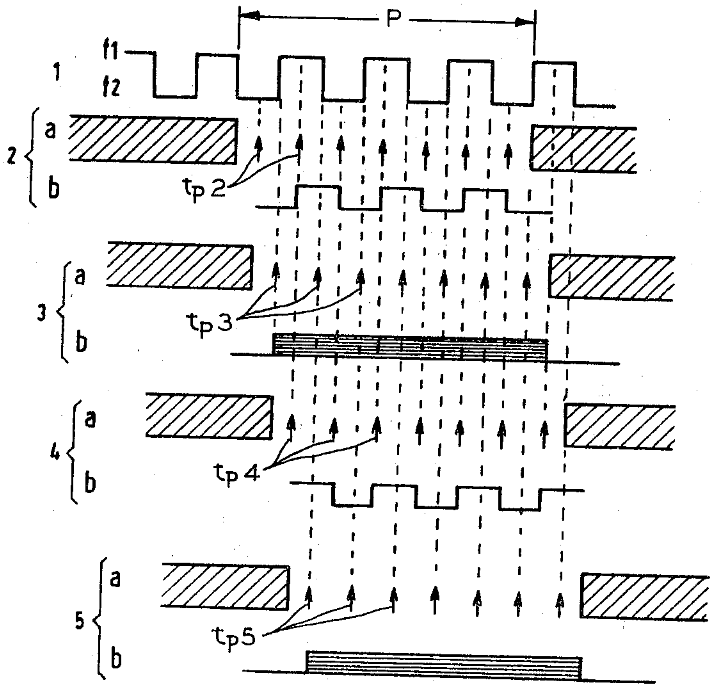
FIG. 4 is a schematic time diagram of how a series of reversals for a third answer-back signal according to the embodiment of FIG. 3 can be scanned and detected.
Figure 5:
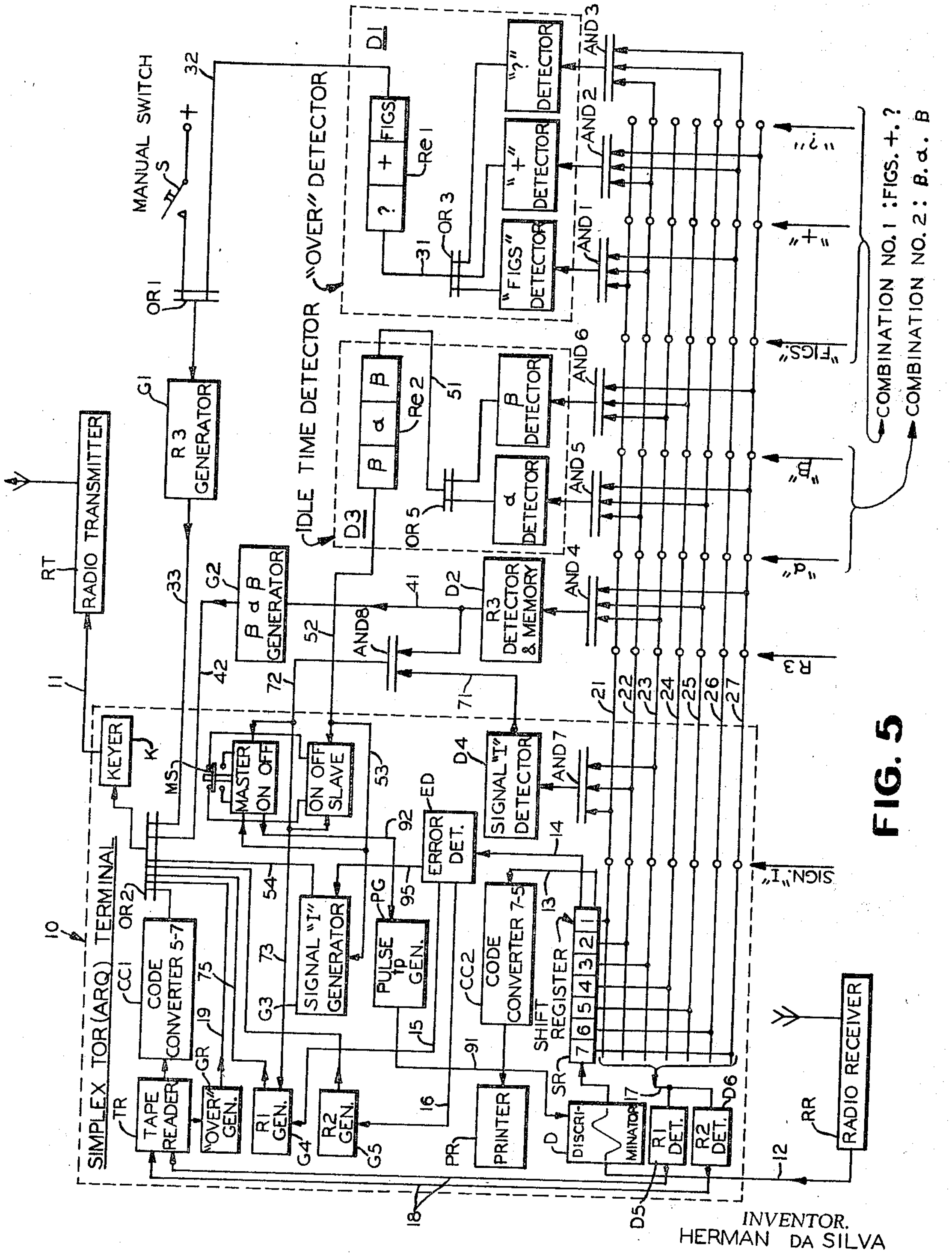
Figure 6:
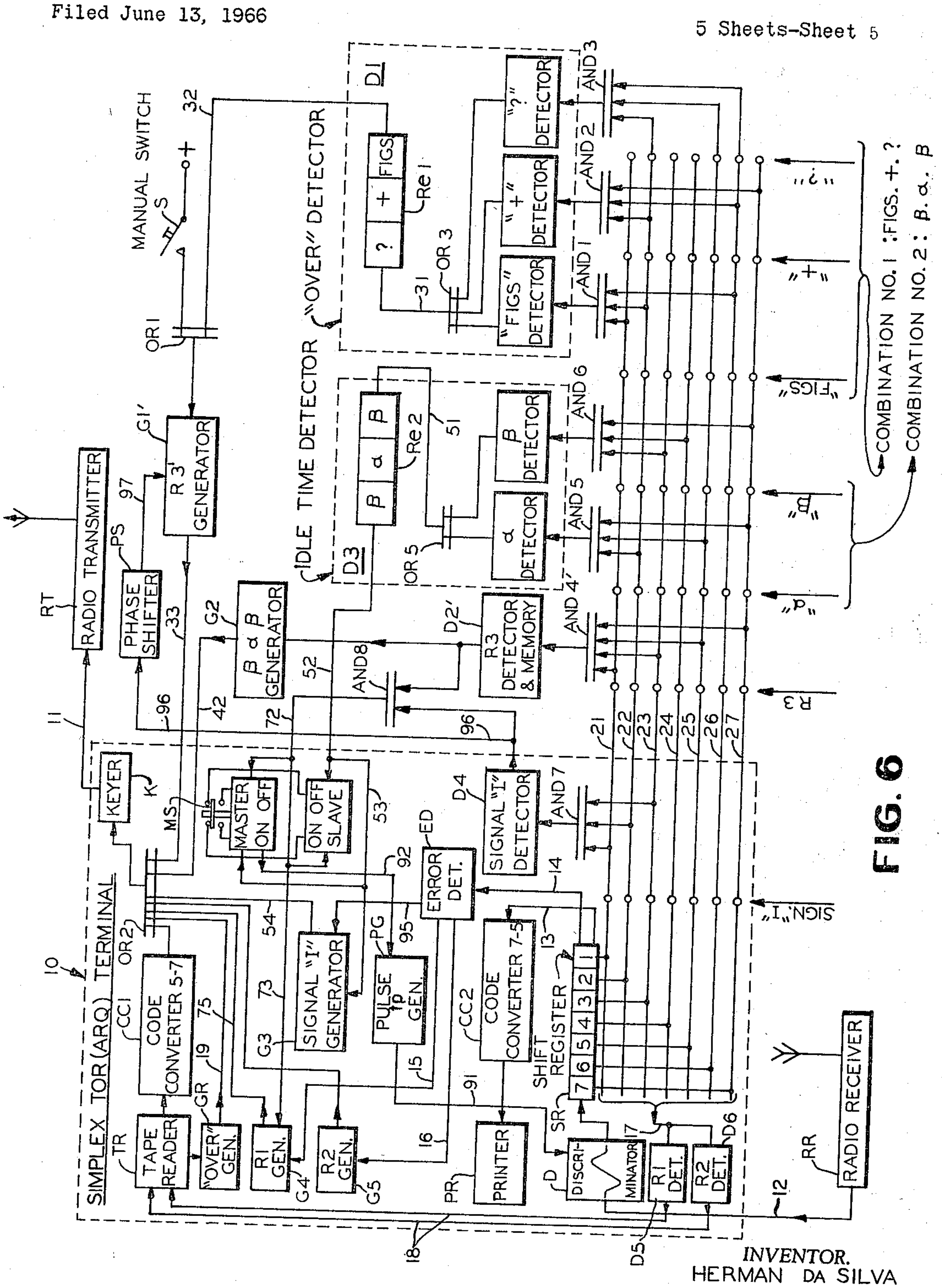

FIG. 5 is a schematic block circuit diagram of a convertible master-slave station for transmitting and receiving the signals according to the embodiment shown in FIGS. 1 and 2; and FIG. 6 is a schematic block circuit diagram similar to FIG. 5 of a convertible master-slave station for transmitting and receiving the reversal type answer-back signals according to the embodiment shown in FIGS. 3 and 4.

A. *The Operations*

In FIG. 1 the time diagram shows the traffic between the stations X and Y plotted against a time scale T. At the time T–0 the station X transmits from its transmitter XZ the message consisting of the letters a, b, and c in block 1. This information is received at the receiver YO of the information-receiving station Y, which asks for the next block 2 by transmitting from its transmitter YZ the answer-back signal R2, during the time T–4 to T–5. After the station X receives in its receiver XO the signal R2, it transmits in block 2 the special combination of characters: "Cy" (figures), "+", "?," thus indicating to station Y that station Y can become an information sending station. After station Y correctly receives this special combination block of three signals (or "over" signal), it detects this combination as request for a switch-over, so the station Y then transmits the third answer-back signal R3 during time T–10 to T–11.

When station X correctly receives a third answer-back signal R3, either in response to this combination or "over" signal, or upon station Y's own initiation, the station X acknowledges receipt of this third answer-back signal R3 by transmitting a special combination of idle time signals $\beta$, $\alpha$, $\beta$ during the time T–12 to T–15, which when correctly received at station Y switches over station Y to its information-sending state at time T–16. This station Y then transmits a block of request for repetition signals I, by means of which it lets the station X know that this switch-over has been completed at station Y. On reception of this block of request for repetition signals I, station X switches itself over to its information-receiving state, and transmits the next answer-back signal R1, thus asking for a block 1. Station Y answers to this block 1 by transmitting the letters p, q, r in a block 1 during the times T–23 to T–26. Now the traffic can pass on normally with station Y sending message information and station X receiving it.

FIG. 2 shows an example of a multi-element mark/space code for the configuration of the request for repetition signals I and the three types of answer-back signals R1, R2 ad R3, in which only a double transposition of elements in each signal can cause one of these four signals to be confused with another.

FIG. 3 is a time diagram similar to FIG. 1 for another embodiment of the system of this invention between the stations X' and Y', showing a different type third answer-back signal R3' being transmitted from the transmitter Y'Z' of station Y', which type is formed by reversals of the two mark/space frequencies, and in which the station X' has a non-synchronous receiver X'O'. Station X' then passes, during a definite time P, the reversing signal R3' to a shift-register where it changes over the register elements according to the reversals received, provided the shift timing pulse does not coincide with the frequency change moments or edge of the gate P.

In FIG. 4, line or graph 1 represents a square wave for part of the received series of reversals of the third answer-back signal R3' formed by the alternating frequencies $f1$ and $f2$. The graph $2a$ relates to the gating circuit which controls, during the time P, the shift register according to the incoming frequency by means of timing pulses $tp2$ represented by the upwardly pointing arrows. The graph $2b$ represents a wave form of the state of the register elements, showing that the reversal configuration has been detected. It has been assumed in this case that the timing pulse $tp2$ appears half-way between two frequency changes. The graphs $3a$, $4a$ and $5a$ relate to the same gating circuit as the graph $2a$, but in the graphs $3a$ and $5a$ the timing pulses $tp3$ and $tp5$ coincide exactly with the frequency change between $f1$ and $f2$ of the received reversals in graph 1. The result is that then the register elements can assume either state, which is indicated in the graphs $3b$ and $5b$ by a horizontally hatched rectangle, and therefor no reversal configuration has been detected.

In the graph $4a$ the timing pulse $tp4$ appears again half-way between two frequency changes, so that the graph $4b$ shows the reversals in the register element configuration.

According to the circuit described in the above mentioned co-pending U.S. patent application Ser. No. 234,-746, there is no synchronism between the receiver of station X' and the transmitter of station Y', so that the local timing pulse of the station Y' can take any position between that of the graph $2a$ and that of the graph $5a$, and only those positions of the graphs $3a$ and $5a$ result in an undefined register element combination. Any other position of the timing pulse $tp$ with respect to the alternating or reversing signal in graph 1 will result either in the register combination of the graph $2b$ or in that of the graph 4b, both detecing the reversals or the third answer-back signal R3'.

If there appears a result as represented by graph $3b$ or $5b$, there is a mutilation, and a request for repetition is transmitted by means of a group of the request for repetition signals I. If the station Y' had actually transmitted reversals, this station X' repeats the transmission of the reversals on receipt of these signals I from station X', but this time with a phase shift of ¼ of period of the wave form shown in graph 1, so that now the frequency changes will be in correct positions with respect to the timing pulses $tp4$ and the registration of the reversals or detection of the third answer-back signal R3' can take place normally. In reality the scanning moments occupy areas of about half a cycle of the reversals.

B. *The circuits*

In FIG. 5 there is disclosed a schematic block wiring diagram of a transmitter-receiver simplex telegraph station circuit which may be used for generating and responding to the third answer-back signal R3 operating according to the embodiment described for FIGS. 1 and 2 above. The traffic signals, in a five-unit code, are directed from the tape reader TR, in the upper left hand corner of the simplex TOR terminal circuit disclosed in the dash line block 10, to a code converter CC1 for converting the five unit code into the seven unit code of the TOR automatic error correcting (ARQ) radio telegraph system. This seven unit code is then passed through an OR-gate circuit OR2 to a keyer K and thence via conductor 11 to the radio transmitter RT. Since this station is transmitting traffic signals, it is a transmitting or master station and the master switch MS in the block 10 is switched to its master position, while the remote station receiving these signals has its switch MS switched to its slave position. The slave position is the normal position of this switch, so that each station is always ready to receive signals. Therefore the master switch MS for this transmission would have to be moved from the full line position shown in block 10 to its other contact shown.

The remote, receiving, or slave station Y circuit of FIG. 5 has its master switch MS in the full line position shown, and the signals are received in the radio receiver RR shown at the lower left corner of the figure, and thence passed through conductor 12 to the simplex TOR terminal block 10 where they are directed via a discriminator D to a shift register SR which may comprise seven separate trigger circuits SR1 through SR7, one for each of the seven elements of the seven unit code received. If these registered signal elements are correctly received, the answer-back signal R2 requesting the next block is sent back to the transmitting station X, and thus these signal elements are successively passed via conductor 13 to the code converter CC2 for converting the seven unit code automatically back to the five unit code, and thence passed to the printer PR for printing the message signals.

The correct or incorrect reception of each multi-element signal is determined by the error detector circuit ED which may be connected to the shift register SR via conductor 14. This error detector circuit ED determines from the association of each block of three message signals alternately with a (1) or a (2), both at the transmitting station and the receiving station by a counter, which of the two answer-back signals R1 or R2 is to be transmitted via the connections 15 and 16 to the answer-back signals R1 and R2 generating circuits G4 and G5. Thus in this example, if the answer-back signal R1 has been sent back instead of the answer-back signal R2, the transmitting station X would then know that block 1 had been incorrectly received and must be repeated. Correspondingly, the receipt of the answer-back signals R1 and R2 at the block signal transmitter X, if received in the shift register correctly, are detected in the R1 and R2 detectors D5 and D6 via multiconductors 17 from the shift register SR, and these detectors D5 and D6 may control the tape reader TR via the separate conductors 18 therefrom, to cause a repetition of the last signal block or the transmission of the next signal block, whichever is required.

The above description corresponds to the normal transmission and reception of traffic, such as for block 1 of the three message signals *a, b, c* at the top of FIG. 1, as well as the automatic error correcting system for these signals and their blocks by proper association of each block with one or the other of the two answer-back signals R1 and R2.

The end of the traffic transmission is indicated by the transmission of the defined group of signals from the master station X to the slave station Y, such as for the example above described in connection with FIG. 1, by the generation from the tape reader TR and/or the special Combination No. 1 signal generator GR of the group of signals comprising "Figs." (or "Cy"), "+," "?," which combination is indicated in the lower right hand corner of FIG. 5 and is transmitted via conductor 19, OR-gate OR2, keyer K, conductor 11, and transmitter RT. When this combination No. 1 of signals are transmitted, they are received at the radio receiver RR and passed through the shift register SR, but thence each of the trigger circuits SR1 through SR7 are conducted through lead lines 21 through 27 to the last three detector circuits shown at the right in FIG. 5. The dots and circles in the lines 21 through 27 correspond to the mark and space elements of the special signals detected, as shown also in FIG. 2. Thus the three separate seven elements of each of these signals "Figs.," "+" and "?" are separately and successively detected through the AND-circuits AND-1, AND-2, and AND-3, and thence conducted respectively to the "Figs.," "+" and "?" detector circuits in the "end of transmission" or "over" detector circuit block D–1. The outputs of each of these separate detector circuits are transmitted successively through OR-gate circuit OR3 via conductor 31 to the register R*e*1 which stores these three separate signals of combination No. 1. The output of this register R*e*1 or of the whole "over" detector circuit D–1 is a pulse which is conducted through conductor 32 to OR-gate circuit OR1 to energize the generator G1 for generating the third answer-back signal R3, which third answer-back signal R3 is then conducted through conductor 33 to the OR-gate circuit OR2 and keyer K and thence via conductor 11 to transmitter RT of the slave station, see the answer-back signal R3 shown near the center portion of FIG. 1.

Since the third answer-back signal may also be generated, according to this invention, at the slave station by requesting an interrupt to transmit messages instead of receiving them, this third answer-back signal R3 also may be generated or instigated by closing a manual or electronic switch S, which also produces a pulse that passes the OR-gate circuit OR1 to energize the third answer-back signal R3 generator G1.

This third service or answer-back signal R3 is received at the master station radio receiver RR and conducted via conductor 12 to the discriminator D, and thence to the shift register SR, and according to the seven elements in this signal R3 shown in FIG. 2, these elements are conducted via conductors 21 through 27 through the AND-gate AND-4 to the R3 detector and memory circuit D–2, which produces an impulse that is conducted via conductor 41 to the idle time or $\beta\alpha\beta$ generator circuit G2. This generated group of idle time signals are then passed via conductor 42 through the OR-gate circuit OR2, keyer K and conductor 11 to the radio transmitter RT for transmission of the $\beta\alpha\beta$ idle time signals shown in the middle of FIG. 1, to indicate to the slave station Y that the third answer-back signal R3 was properly received at the master or transmitting station X, and that the station X can be converted from a transmitting to a receiving station.

This combination No. 2 of signals $\beta$, $\alpha$, $\beta$ is detected at the receiver of station Y, which sent the third answer-back signal R3, via its radio receiver RR and thence conducted via conductor 12 through the discriminator D, shift register SR, conductors 21 through 27 and the AND-gates AND-5 and AND-6 to the $\alpha$ and $\beta$ detector circuits in the idle time detector block D–3. The outputs of these $\alpha$ and $\beta$ detectors are passed through OR-gate circuit OR5 to the register R*e*2 for registering the combination No. 2 of signals $\beta$, $\alpha$, $\beta$ to produce a pulse which is conducted via conductors 52 and 53 for changing over the On-Off Slave and Master On-Off switch circuits so that the previously receiving or slave station Y now will become a master or transmitting station. This pulse from the detector D–3 also passes via conductor 53 to the request for repetition signal I generator circuit G3 to generate three signals I that are conducted via conductor 54 through the OR-gate circuit OR2 and thence via keyer K and conductor 11 to the transmitter RT. The reception of these three I signals via the radio receiver RR of the former transmitting station X in its shift register SR, are detected via conductors 21 through 27 to the signal I detector circuit D–4 via AND-gate circuit AND 7, which circuit D–4 then produces a pulse via conductor 71 to AND-gate AND 8, which in combination with the potential already applied thereto from the R3 detector and memory circuit D–2, produces a pulse in conductor 72 to operate the Master On-Off and On-Off Slave switch circuits at this former transmitting station X to change it over to a receiving or slave station. It should be noted that this station is not switched over to a slave station unless it has received both the third answer-back signal R3 and the three request for repetition signals I.

Also via conductors 72 and 73, the first one of the two normal answer-back signals R1 and R2 is generated, in generator G4 of generators G4 and G5, which first answer-back signal R1 is passed via conductor 75 through OR-gate circuit OR2, keyer K, and conductor 11 to radio transmitter RT. The reception of this first answer-back signal R1 is an indication to the interrupting station to proceed with its first message signal, see block 1 of the letters "pqr" shown at the lower portion of FIG. 1.

The reception of the two normal answer-back signals R1 and R2 are via the radio receiver RR conductor 12, discriminator D, shift register SR and thence via combination of conductors 21 through 27 via line 17 to the R1 and R2 detectors D5 and D6.

In an asynchronous system as described above in connection with FIGS. 3 and 4, the block wiring diagram circuit of FIG. 6 may be employed, which circuit is a modification of the diagram of the receiver-transmitter shown in FIG. 5. The operation of the circuit in FIG.

6 is the same as that described above for FIG. 5 for all portions thereof regarding the transmission and reception of blocks 1 and 2 of message signals, the normal two answer-back signals R1 and R2, the "over" or Combination No. 1 of signals "Figs.," "+," "?," the idle time signals $\beta$, $\alpha$, $\beta$, and the request for repetition signals I.

The only portion of this circuit in FIG. 6 which is different from that disclosed in FIG. 5 has to do with the transmission and detection and request for repetition of the third answer-back signal R3', which in this instance comprises an oscillating or alternating mark and space frequency $f1$, $f2$. In this instance these alternations have a duration of one element of each multi or seven element signal, as distinguished from the normal answer-back signals R1 and R2 in which all seven elements are of one of the two frequencies $f1$ or $f2$. This third alternating answer-back signal R3' is generated in the generator G1' and is transmitted from the slave or receiving station under the same conditions as the third answer-back signal R3 mentioned in the previously described circuit of FIG. 5, by passing from the generator G1' through conductor 33, OR-gate circuit OR2, keyer K, and conductor 11 to radio transmitter RT.

The reception of this alternating third answer-back signal R3' at the then transmitting or master station is through its radio receiver RR, and conductor 12 to discriminator D, where it is scanned by the pulses *tp* (see FIG. 4) from the pulse *tp* generator PG via conductor 91. If the pulses *tp* do not occur at the same time as the change or alternations in the frequencies $f1$ and $f2$, these alternations are detected and passed to the shift register SR to alternately energize the element triggers SR1 through SR7 as marks and spaces. These alternate mark and space elements are then passed via the conductors 21 through 27 through the AND-gate AND 4' to the R3' detector and memory circuit D2' to produce the potential that is passed to the idle time signal generator G2 and the AND-gate circuit AND 8 as described above for the third answer-back signal R3. This pulse *tp* generator circuit PG only needs to operate for scanning received answer-back signals R1, R2 and R3', or when the station is acting as a master station, and thus it may be controlled by the operation of the Master On-Off switch circuit via conductor 92. This is because in an asynchronism system the remote receiving or slave station takes its synchronism from the elements of the received message signal from the master station, while that of the answer-back signals to the master station will generally be out-of-phase with these transmitted message signals, if for no other reason than the distance in time for transmission between the two stations.

However, if the scanning pulses *tp* occur during the change-overs from one frequency to the other as described above in graphs 3 and 5 of FIG. 4, no signal elements will be passed to the shift register SR, and the error detector ED connected thereto via conductor 14 will indicate that no answer-back signal has been received, and simultaneously no signal will be detected by the third answer-back signal R3' detector and memory circuit D2. Under these conditions, the error detector circuit ED actuates the request for repetition signal I generator G3 via conductor 94, which causes three signals I to be transmitted to the still message receiving station Y to repeat the third answer-back signal R3'. When these three request for repetition signals I are received at this station Y, they are detected in the signal I detector circuit D4, and since no R3' signal has yet been correctly received, the AND-gate AND-8 will not be conductive, but the potential from the circuit D4 will pass through conductor 96 to the phase shifter circuit PS to change the cycle of alternations of the frequencies in the third answer-back signal R3' generator G1', via conductor 97, by one quarter of the alternating period. Thus the alternations of the next signal R3' which is transmitted will be out-of-phase with the scanning of the pulse *tp* from the pulse generator PG at the still master station X and will be properly scanned as shown in graphs 2 and 4 of FIG. 4, to operate the triggers SR1 through SR7 of the shift register SR, and thus be correctly received to effect the reversal of message transmission as previously described for FIG. 5.

The scanning pulses *tp* from the pulse generator PG when scanning the normal answer-back signals R1 and R2 do not need to be shifted, in that the frequency of all seven of the elements is the same for each such signal, and all of the triggers SR1 through SR7 are then all operated alike, which operations are detected in the corresponding R1 and R2 detectors D5 and D5 via conductors 21 through 27 and 80.

Although a flywheel or resonant circuit may be employed instead of the shift register SR described in FIG. 6 above for detecting the number of oscillations of the frequencies $f1$ and $f2$ of the third answer-back signal R3', such does not change the scope of the present invention, in that various different circuits may be employed for the detection of the third answer-back signal R3' in an asynchronous system.

While there is described above the principles of this invention in connection with specific apparatus, it is clearly understood that this description is made only by way of example and not as a limitation of the scope of this invention.

What is claimed is:

1. An automatic error correcting simplex telecommunication system for changing direction of traffic information between two stations (X and Y) in which each station has:

(A) means (K, RT) for transmitting blocks (1, 2) of traffic information signals spaced by pauses between each block, and (B) means (G4, G5) for transmitting two different answer-back signals (R1, R2) during said pauses for indicating correct and incorrect reception of the block just received from a remote station;

the improvement comprising:

(C) means (G1) at each station for transmitting during one of said pauses a third answer-back signal (R3 or R3') different from said two answer-back signals (R1, R2) for indicating to said remote station that the direction of traffic information is to be changed.

2. A system according to claim 1 including:

(D) means (GR) at each transmitting station for transmitting an "over" signal (Figs., +, ?) to instigate the transmission from the remote receiving station of said third answer-back signal (R3 or R3').

3. A system according to claim 1 including:

(D) means (G2 and AND–8) for transmitting from each said station an acknowledgment signal ($\beta\alpha\beta$) of the reception of said third answer-back signal (R3 or R3'), and for preparing (AND–8) that station for receiving blocks of traffic information.

4. A system according to claim 3 including:

(E) means (G3) for transmitting from each said station a request signal (I) in response to said acknowledgment signal ($\beta\alpha\beta$), and (F) means (72, 73) for changing each said station over to receive spaced blocks of traffic information in response to said request signal (I) and for transmitting from that station said two answer-back signals (R1, R2) during the pauses between each block received.

5. A system according to claim 1 wherein said two answer-back signals are signals corresponding to two different frequencies ($f1$, $f2$), and wherein said third answer-back signal (R3') comprises a signal alternating between said two frequencies.

6. A system according to claim 5 including:

(D) means (PG) for scanning said frequencies at a predetermined time (P) during each pause, and (E) means (D2′) for detecting the alternating frequencies of said third answer-back signal (R3′) when their alternations are out-of-phase with the limits of said predetermined detecting time (P).

7. A system according to claim 6 including:

(F) means (ED) for determining when the alternations of said frequencies of said third answer-back signal (R3′) correspond in time with a limit of said detecting time (P) so that said third answer-back signal cannot be detected, (G) means (G3) for transmitting a request for repetition signal (I) in response to said determining means, and (H) means (PS) for shifting the phase of said alternations in said third answer-back signal (R3′) before re-transmitting the same so that they can be scanned and properly detected.

8. In an automatic error correcting simplex telecommunication system in which spaced numbered blocks 1 and 2 of information signals are transmitted in one direction between two stations (X, Y), and two different answer-back signals (R1, R2) are transmitted from the station receiving said blocks between each block to indicate to the block transmitting station that the just received block was either correctly received and the next block should be transmitted, or that the just received block was incorrectly received and must be repeated; the improvement comprising a system for reversing the direction of transmission of information between said two stations (X, Y), said reversing system comprising:

(A) means (G1) for generating a third answer-back signal (R3 or R3′) at said block receiving station and transmitting it between said blocks, and (B) means (D2) for detecting said third answer-back signal at said block transmitting station for changing over said block transmitting station to a block receiving station.

9. A system according to claim 8 including:

means (GR) at said block transmitting station for transmitting an "over" signal (FIGS., +), and means (D1) at said block receiving station for detecting said "over" signal to instigate said third answer-back signal generating means (G1).

10. A system according to claim 8 including:

means (G2) at said block transmitting station for generating and transmitting a signal ($\beta\alpha\beta$) acknowledging receipt of said third answer-back signal (R3 or R3′) and to prepare (AND–8) said block transmitting station for its change-over to a block receiving station.

11. A system according to claim 10 including:

means (D3) at said block receiving station for detecting said acknowledging signal ($\beta\alpha\beta$), and changing (52) over said block receiving station to a block transmitting station, and means (G3) for generating and transmitting a request signal (I) in response to said acknowledging signal detecting means (D3).

12. A system according to claim 11 including:

means (D4) for detecting said request signal (I) at the original said block transmitting station by changing over to a block receiving station, and transmitting (G4, 73) the first (R1) of said two answer-back signals (R1, R2) requesting the transmission of the first block of information signals from the original said block receiving station.

No references cited.

NEIL C. READ, *Primary Examiner.*

T. A. ROBINSON, *Assistant Examiner.*